April 7, 1964     A. W. HOLSTEIN ETAL     3,128,013

VENDING MACHINE

Filed April 7, 1961     9 Sheets-Sheet 1

Alvin W. Holstein,
Harry H. Pryor,
Fred J. Melvin,
   Inventors.
Koenig, Pope, Senniger and Powers,
   Attorneys.

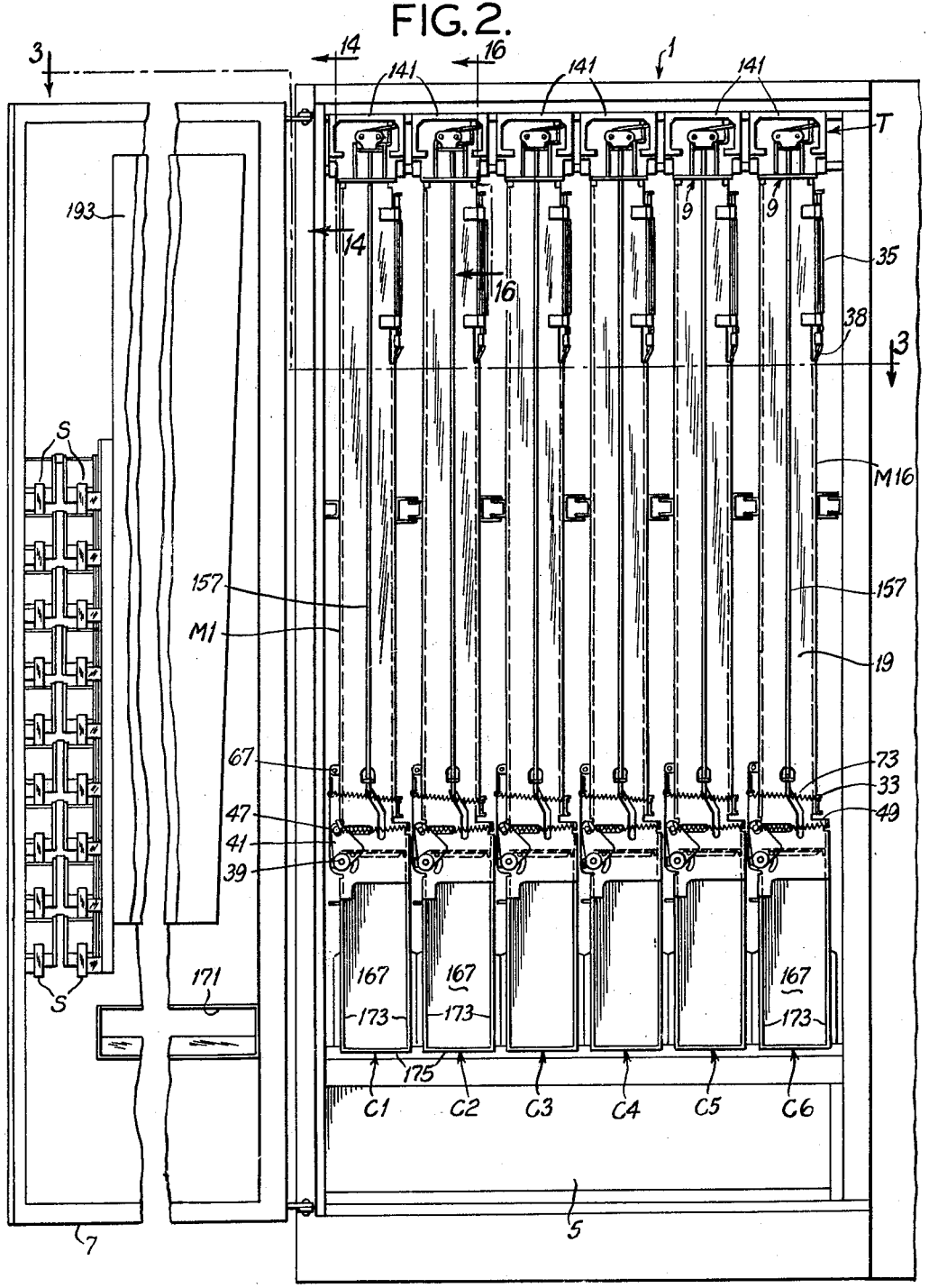

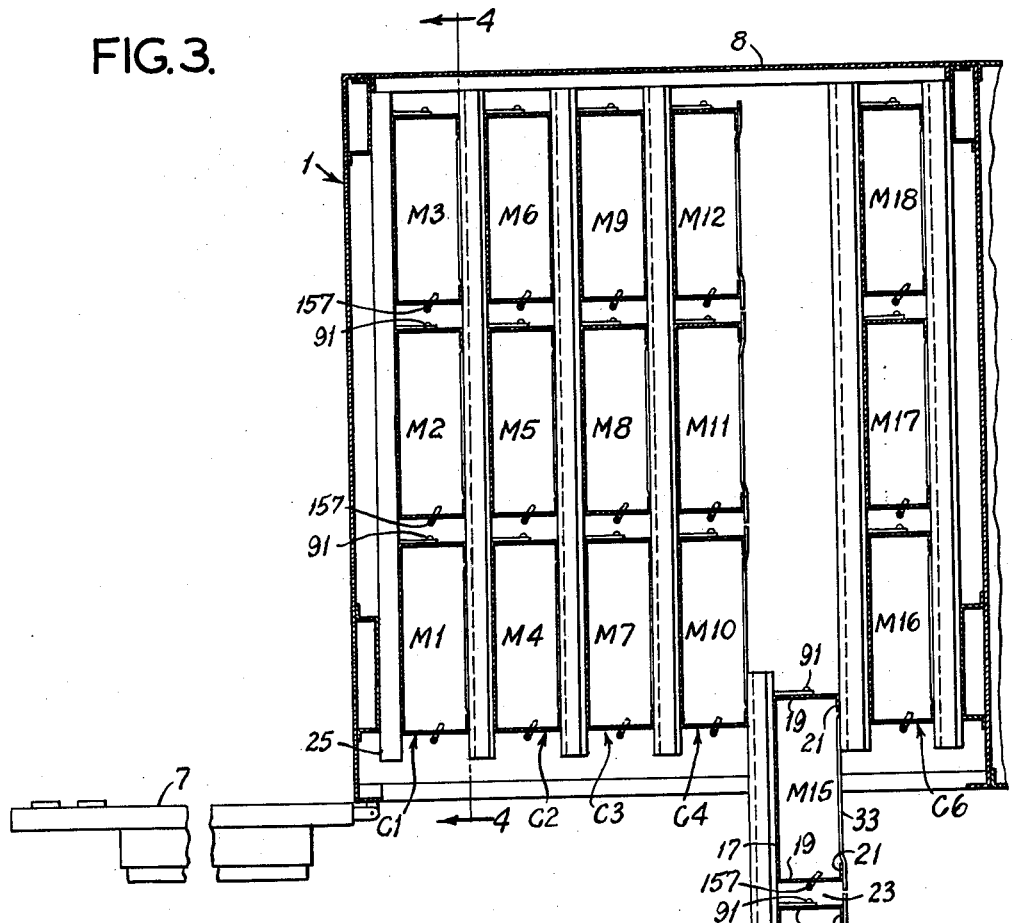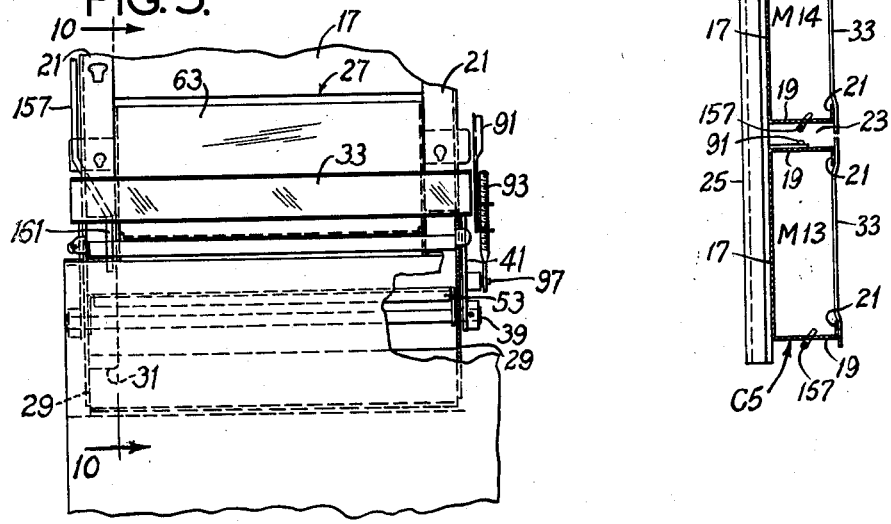

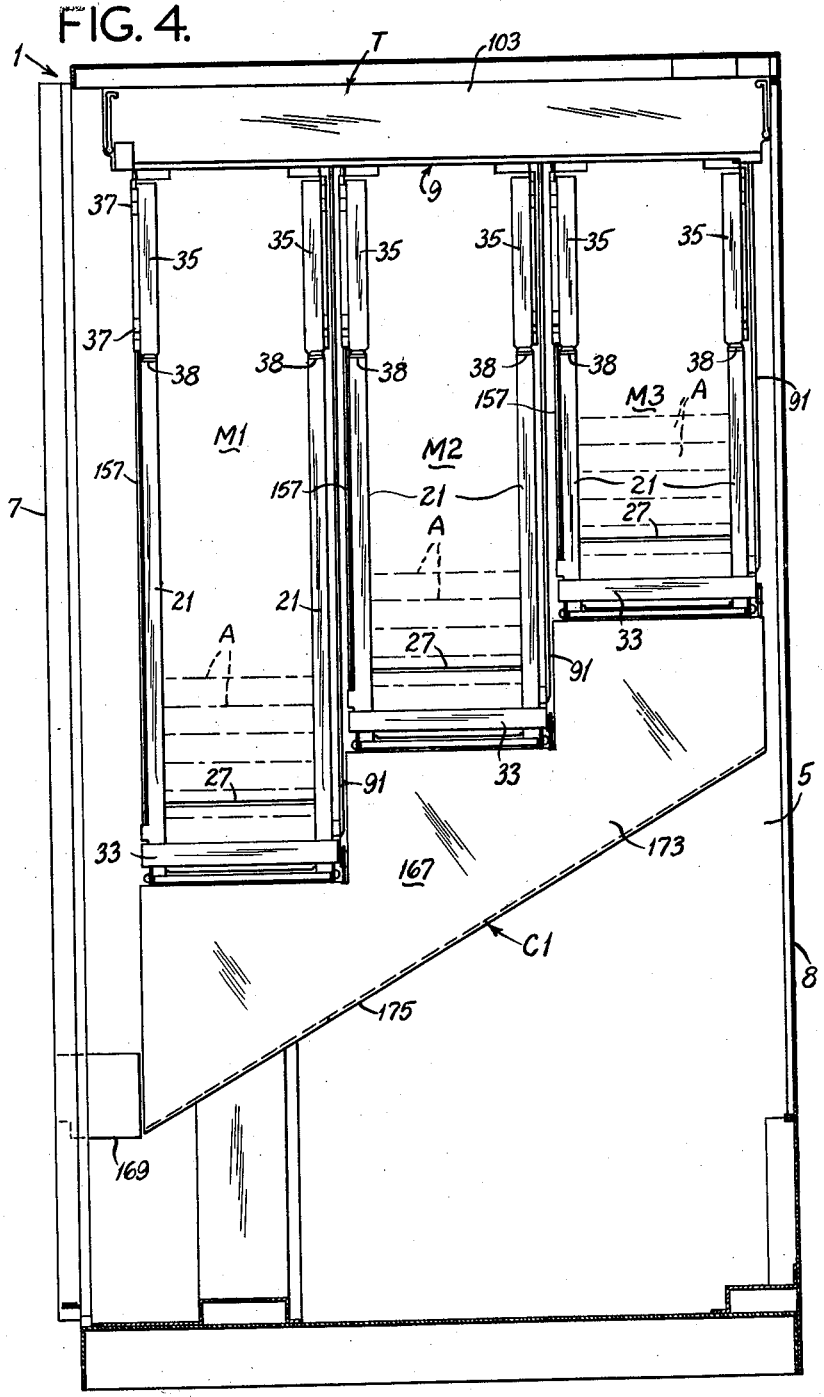

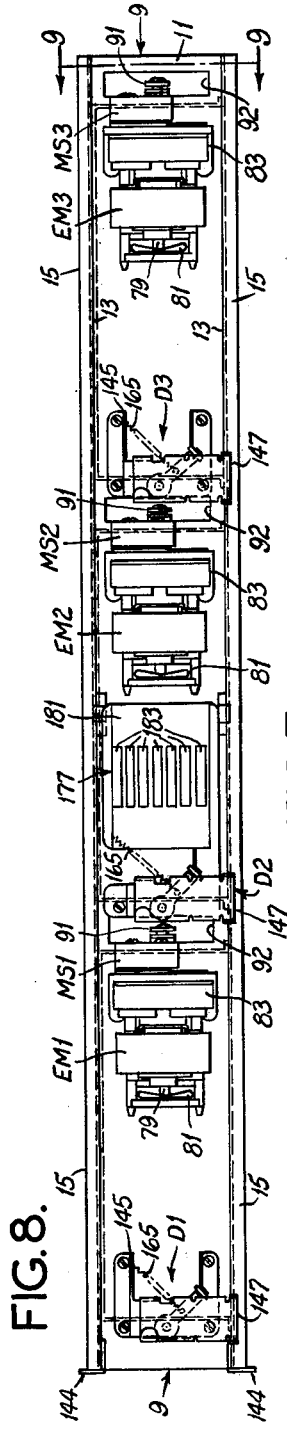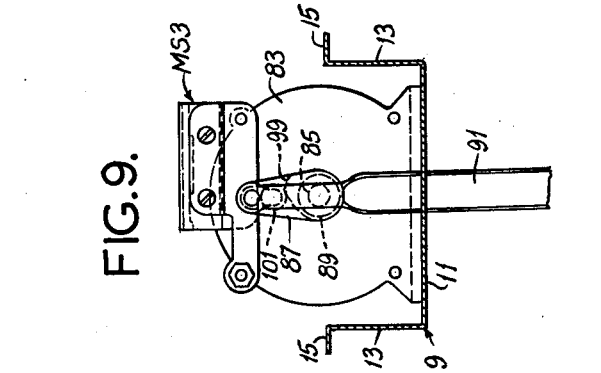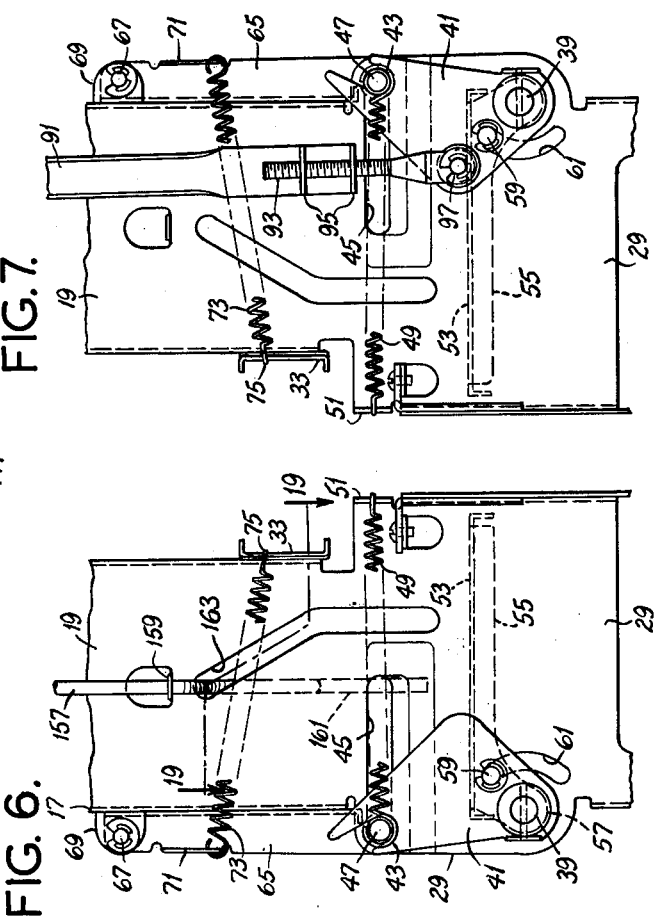

April 7, 1964 A. W. HOLSTEIN ETAL 3,128,013

VENDING MACHINE

Filed April 7, 1961 9 Sheets-Sheet 6

April 7, 1964   A. W. HOLSTEIN ETAL   3,128,013
VENDING MACHINE
Filed April 7, 1961   9 Sheets-Sheet 7

April 7, 1964  A. W. HOLSTEIN ETAL  3,128,013
VENDING MACHINE
Filed April 7, 1961  9 Sheets-Sheet 8
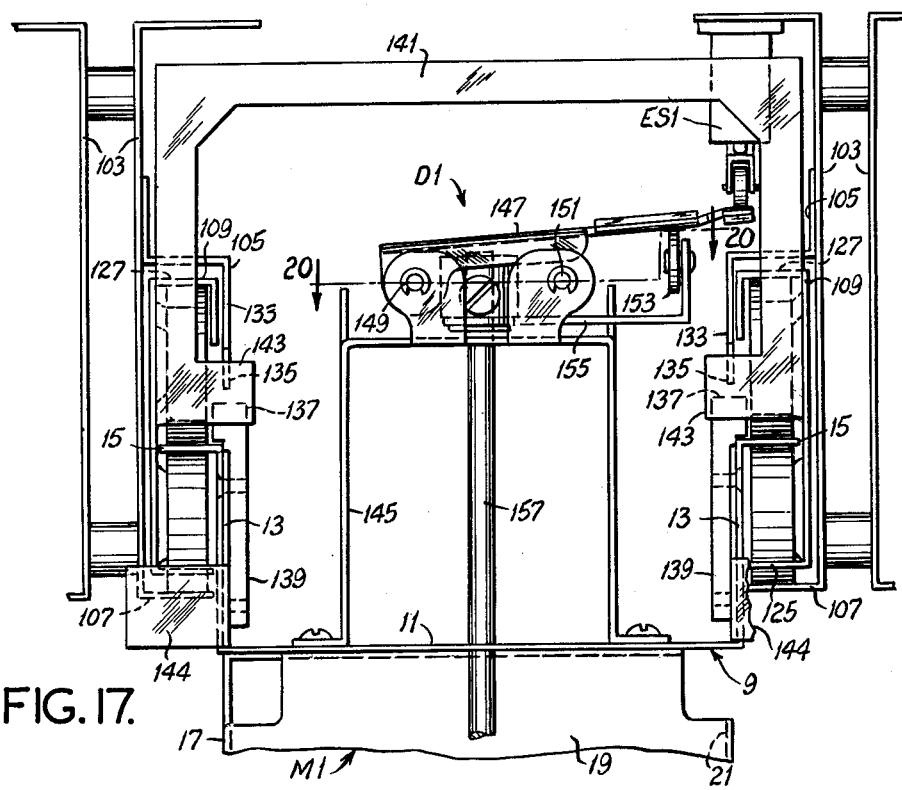
FIG. 17.
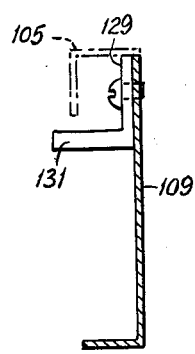
FIG. 19.
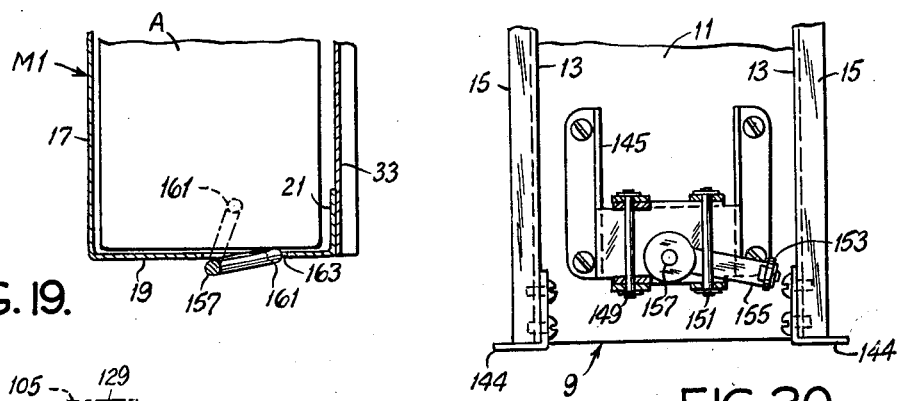
FIG. 18.
FIG. 20.

United States Patent Office 3,128,013
Patented Apr. 7, 1964

3,128,013
VENDING MACHINE
Alvin W. Holstein, Brentwood, Harry H. Pryor, St. Louis, and Fred J. Melvin, Bellefontaine Neighbors, Mo., assignors, by mesne assignments, to Universal Match Corporation, Ferguson, Mo., a corporation of Delaware
Filed Apr. 7, 1961, Ser. No. 101,465
11 Claims. (Cl. 221—129)

This invention relates to vending machines, and more particularly to a vending machine of a type for vending cartons of cigarettes or like packages.

Among the several objects of the invention may be noted the provision of a vending machine of the class described which, while having a large capacity for cartons of cigarettes or the like, is relatively compact considering the number of cartons which may be stocked therein; the provision of a vending machine of the class described having a plurality of magazines, each of which is adapted to hold a stack of cartons and which is adapted to dispense the lowermost carton of the stack, with the magazines arranged one behind another in the cabinet of the machine for maximum utilization of space in the cabinet; the provision of a vending machine which is easy to load despite having magazines one behind another; the provision of a vending machine such as described having a plurality of vending columns each comprising a plurality of magazines, these columns being mounted for individual movement from a position within the cabinet to a loading position outside the cabinet, the columns being positioned side-by-side when in the cabinet for maximum utilization of space therein and the magazines being adapted for easy loading from one side thereof by moving the columns outward to loading position; the provision of a vending machine such as described adapted to permit a number of the magazines to be stocked with the same brands of cigarettes and to provide for vending from a second of these magazines when a first is emptied, from a third when the second is emptied, etc.; and the provision of a vending machine such as described which is reliable in operation. Other objects and features will be in part apparent and in part pointed out hereinafter.

The invention accordingly comprises the constructions hereinafter described, the scope of the invention being indicated in the following claims.

In the accompanying drawings in which one of various possible embodiments of the invention is illustrated, FIG. 1 is a perspective of a carton vending machine of this invention;

FIG. 2 is a front elevation of the left-hand portion of the machine with a door thereof shown in open position, the door being partly broken away to reduce the width of the view;

FIG. 3 is a horizontal section taken on line 3—3 of FIG. 2, and illustrating a column of the machine pulled out to loading position;

FIG. 4 is a vertical cross section taken on line 4—4 of FIG. 3, but showing the door closed;

FIG. 5 is an enlarged fragment of FIG. 4, showing the lower end of a magazine, and with parts broken away and shown in section;

FIG. 6 is an enlarged elevation of the left-hand side of FIG. 5;

FIG. 7 is an enlarged elevation of the right-hand side of FIG. 5;

FIG. 8 is a plan view of the top of one column;

FIG. 9 is an enlarged vertical section taken on line 9—9 of FIG. 8;

FIG. 17 is an enlarged fragment of FIG. 2;

FIG. 18 is an enlarged vertical section taken on line 18—18 of FIG. 14;

FIG. 19 is a horizontal section taken on line 19—19 of FIG. 6, showing in solid lines a feeler as it appears when engaging a carton and showing in dotted lines the position of the feeler when the magazine is emtpy;

FIG. 20 is a horizontal section taken on line 20—20 of FIG. 17; and

Corresponding reference characters indicate corresponding parts throughout the several views of the drawings.

Figure 1:
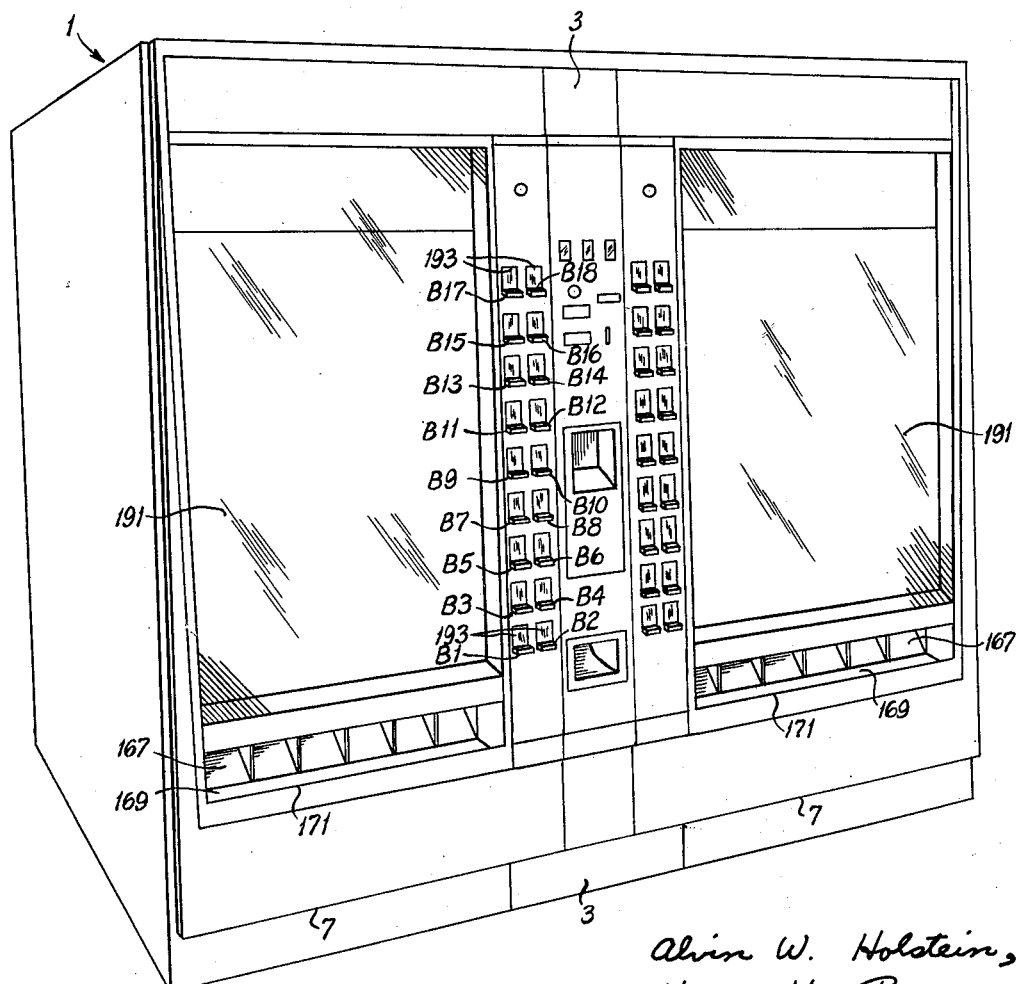

Referring to the drawings, first more particularly to FIG. 1, a carton vending machine of this invention is shown to comprise a cabinet 1 divided into left- and right-hand compartments by a money-handling unit 3. The latter extends centrally of the cabinet from front to rear. In FIGS. 2–4, the left-hand compartment is shown, being designated 5. The cabinet has a front door 7 for the left-hand compartment and a front door (also designated 7 in FIG. 1) for the right-hand compartment. The left-hand door 7 is hinged at its left side to be swingable outward away from the cabinet on a vertical axis. The right-hand door is hinged at its right side to be swingable outward away from the cabinet on a vertical axis. Each compartment contains dispensing apparatus to be described, the apparatus in the two compartments being generally identical except that they are left-hand and right-hand versions of the same construction. Accordingly, a description of the apparatus in the left-hand compartment, as follows, will suffice for both.

Thus, the apparatus in the left-hand compartment comprises a plurality of vending columns, each generally designated by the letter C. There are, for example, six such columns in the left-hand compartment, and these are specifically designated C1–C6. These six columns are identical, each comprising a plurality of magazines, each magazine being generally designated by the letter M. As herein illustrated, each column comprises three magazines. Thus, there are eighteen magazines in the left-hand compartment, and these are specifically designated M1—M18. Here it will be understood that there are six similar columns each comprising three magazines in the right-hand compartment, so that there are twelve columns and thirty-six magazines in all in the cabinet 1.

Each magizine is of rectangular shape in horizontal cross section, its dimensions being such that it is adapted to hold a stack or stock of cartons A either of king size cigarette packs or regular size packs to be vended. Means is provided for mounting each column for movement from a position within the cabinet to a forward loading position outside the cabinet or, alternatively, to a rearward loading position outside the cabinet. The cabinet 1 has a removable rear panel 8 for the latter purpose. FIG. 3 shows the column C5 in forward loading position (the left-hand door 7 being open). The mounting arrangement is such that columns C1–C6, when in the cabinet, are positioned side-by-side closely adjacent one another for maximum utilization of space in the cabinet. The columns and magazines are so constructed that any given magazine may be loaded from one side of the magazine (the right side as to any magazine of any left-hand column and the left side as to any magazine of any right-hand column) when the column including that magazine is in loading position. Each magazine has dispensing means associated therewith for dispensing the lowermost carton of the stack contained therein, as will be made clear.

Referring more particularly to FIG. 3, it will be observed that, as to each of columns C1–C6, the three magazines thereof are located one behind another, with the long dimensions of the magazine cross sections extending in front-to-rear direction. Thus, as to column C1, magazine M1 is at the front, M2 is behind M1, and M3 is at the rear behind M2; as to column C2, magazine M4 is at the front, M5 is behind M4, and M6 is at the rear behind M5. The arrangement as to the other columns M5, M8, M11, M14 and M17 are of lesser height than the will be apparent. The magazines are all substantially identical, except that the intermediate magazines M2, M5, M8, M11, M14 and M17 are of lesser height than the front magazines M1, M4, M7, M10, M13 and M16, and the rear magazines M3, M6, M9, M12, M15 and M18 are of lesser height than the intermediate magazines (see FIG. 4). All the magazines have their upper ends at the same level so that the lower ends of the intermediate magazines are above the lower ends of the front magazines and the lower ends of the rear magazines are above the lower ends of the intermediate magazines.

Each column includes an elongated horizontal top member 9 (see FIGS. 2, 4, 8, 9 and 12–15), shown as consisting of a channel-section member having a bottom web 11, upstanding sides 13, and outwardly extending horizontal flanges 15 at the upper edges of the sides. The three magazines of each column have their upper ends secured to the bottom of the column top member or channel 9, and extend downwardly therefrom. Each magazine comprises a channel-section member, the web of which is designated 17 and the flanges of which are each designated 19. The latter have inturned marginal lips 21 (see FIGS. 3 and 4). Flanges 19 have a width slightly greater than the width of a carton A of king size cigarette packs. Web 17 has a width slightly greater than the length of a carton. The width of channel 9 corresponds to the width of flanges 19 and the length of channel 9 is somewhat greater than three times the width of a web 17.

As to each column in the left-hand compartment, the three magazines have their upper ends secured to channel 9 with their webs 17 in a vertical plane at the left side of channel 9, flanges 19 of each magazine therefore extending toward the right front web 17. It will be understood that this arrangement is reversed as to the columns in the right hand compartment, i.e., webs 17 are in a vertical plane at the right side of channel 9, with flanges 19 extending toward the left. Thus, the magazines of the columns in the left-hand compartment face right, and the magazines of the columns in the right-hand compartment face left.

As to each column, the three magazines thereof hang down from channel 9, with the front magazine the tallest, and the rear magazine the shortest so that the lower ends of the three magazines are stepped downward from the rear toward the front as appears in FIG. 4. The three magazines are spaced apart along the length of channel 9, with spaces 23 between the rear flange of the front magazine and the front flange of the intermediate magazine and between the rear flange of the intermediate magazine and the front flange of the rear magazine. The three magazines of each column are braced by a horizontal brace 25 extending on the outside of the webs 17 of the magazines about mid-height of the front magazines.

The web 17 of each magazine has an opening 27 (see FIGS. 5, 10 and 11) adjacent the lower end of the magazine. This is a rectangular opening, extending from near one flange 19 to near the other flange 19 of the magazine. At this region, the flanges 19 have widened portions 29, each of the latter having an inturned marginal lip 31. Lips 21 of flanges 19 extend from just above widened flange portions 29 to points short of the upper ends of flanges 19. A horizontal brace 33 spans lips 21 at the lower end of the latter. Flaps 35 are hinged as indicated at 37 to the edges of flanges 19 above lip 21, the hinging being such as to allow the flaps to be slid up and down. The flaps are adapted to occupy a downward closed position wherein their lower ends are behind bent-out upper end portions 37 of lips 21. The flaps are adapted to be slid upward and then swung out to open the upper end portion of the magazine for insertion of cartons, after which they are swung back in and slid down for engagement of their lower ends behind upper end portions 38 of lips 21 to retain cartons at the upper end of the magazine within the magazine. Cartons below the flaps are retained in the magazine by lips 21.

A horizontal shaft 39 extends between portions 29 of flanges 19 of each magazine adjacent the left-hand lower corners of portions 29. This shaft is journalled in openings in portions 29 and has crank arms 41 of generally triangular shape secured on its ends outside portions 29 (see FIGS. 6 and 7). Arms 41 extend upward from shaft 39, and each has a notch 43 at its upper end. Flange portions 29 have horizontal slots 45 at the top thereof extending toward the right from near the left-hand edges of portions 29. A rod 47 has end portions received in slots 45 and notches 43, and is slidable in slots 45 upon rocking of arms 41. Coil tension springs 49 connected between the ends of rod 47 and ears 51 on flange portions 29 bias rod 47 to move toward the right as viewed in FIG. 6 and thereby bias arms 41 to swing clockwise as viewed in FIG. 6. Rod 47 is normally held back in a retracted position at the rear of slots 45 against the bias of springs 49 as will be made clear. In its retracted position, rod 47 is located outward of the web 17 of the magazine, clear of cartons stacked up in the magazine.

A gate or trap door 53 is provided for supporting the stack of cartons in the magazine. This trap door has downwardly extending end flanges 55 which have downward extensions 57 at one end receiving shaft 39 for pivoting the trap door on the shaft axis. A rod 59 extends between the crank arms 39 through arcuate slots 61 in flange portions 29 and through holes in trap door flanges 55, the arrangement being such that when rod 47 and arms 41 are in their retracted position, the trap door is held up in horizontal carton-supporting position (see FIGS. 6 and 10) and when the arms 41 rock clockwise as viewed in FIG. 6, the trap door tilts downward (see FIG. 11) to allow the lowermost carton to slide off. When this occurs, rod 47 moves to the position illustrated in FIG. 11 underneath the next carton above. It will be observed that the pivotal axis of the trap door 53 is below and at the left of the trap door, and that the arrangement is therefore such that as the trap door swings down to discharge the carton thereon, the upper left edge of the carton being discharged is brought forward and immediately downward so that it does not have to push up against the stack of cartons.

A presser plate 63 is provided for pressing the carton (which may be referred to as the second carton) immediately above the carton being discharged to hold it in horizontal position in the magazine, i.e., to prevent it from tipping on rod 47 as the first carton is being discharged. This plate is generally rectangular in shape, having a length somewhat less than the length of the opening 27 in the web 17 of the magazine and a height corresponding to the height of opening 27. It has outwardly extending end flanges 65, and is pivoted for swinging movement on a horizontal axis adjacent the top of opening 27 by means of a horizontal rod 67 extending through these flanges and through ears 69 bent out from the web 17 of the magazine. Flanges 65 are formed with laterally extending ears 71, and coil tension springs 73 connected to these ears and connected at 75 to the magazine bias the plate 63 to swing in through opening 27 into gripping engagement with the second carton. Flanges 65 have downward extensions 77 which engage rod 47. The latter, when in retracted position, holds plate 63 back in retracted position clear of the second carton (see FIG. 10). When rod 47 is advanced on operation of crank arms 41, plate 63 swings forward to engage the back of the second carton and press it against brace 33, thereby in effect clamping it in the magazine (see FIG. 11).

Figure 10:
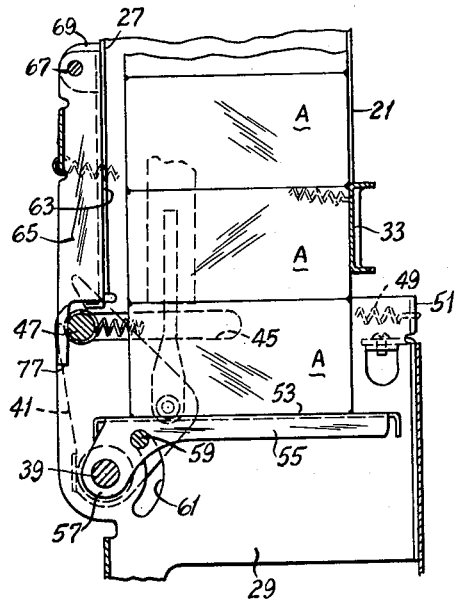
FIG. 10 is an enlarged vertical section taken on line 10—10 of FIG. 5.
Figure 11:
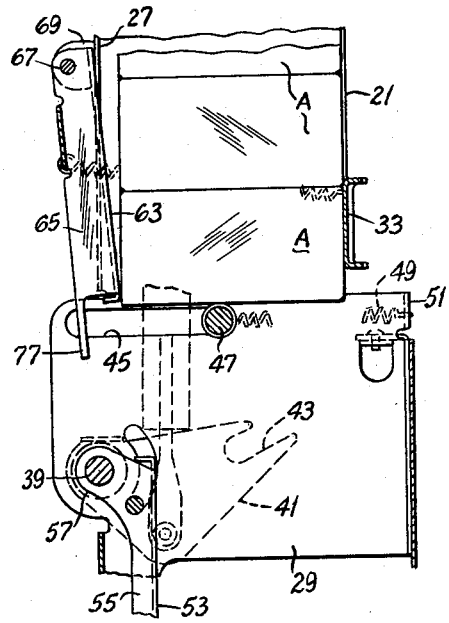
FIG. 11 is a view corresponding to FIG. 10 showing a moved position of parts.

Means is provided for rocking the crank arms 41 of each magazine to swing the respective trap door 53 from its horizontal carton-supporting position of FIGS. 6, 7 and 10 to a vertical discharge position (see FIG. 11) and then back to horizontal position. As shown, this means comprises an electric motor, one for each magazine, mounted on the column top channel 9. Each motor is generally designated by the letters EM, and in FIGS. 8 and 16 the motors for magazines M1, M2 and M3 are specially designated EM1, EM2 and EM3. The motor for the front magazine of each column is located somewhat forward of the intermediate magazine, the motor for the intermediate magazine is located somewhat forward of the rear magazine, and the motor for the rear magazine is located adjacent the rear end of channel 9. Thus, the motor EM1 is located somewhat forward of magazine M1, the motor EM2 is located somewhat forward of magazine M2, and the motor EM3 is located adjacent the rear end of channel 9. The shaft of each motor is designated 79, and the motor is mounted on the web 11 of channel 9 with the shaft extending lengthwise of channel 9. Shaft 79 has a fan 81 at its forward end and its rearward end extends into a speed-reducing gear box 83. The output shaft of the gear box is indicated at 85 in FIG. 9. A crank 87 has a hub 89 fixed on the output shaft. A link 91 connects crank 87 and the rear crank arm 41 of the respective magazine. The link 91 for the front magazine of each column extends down through a hole 92 in the web 11 of channel 9 and through the space 23 between the front magazine and the intermediate magazine. The link 91 for the intermediate magazine of each column extends down through a hole 92 in the web of channel 9 and through the space 23 between the intermediate magazine and the rear magazine. The link 91 for the rear magazine extends down through a hole 92 in the web of channel 9 at the rear of the rear magazine. An eyebolt 93 (see FIG. 7) is threaded in ears 95 at the lower end of each link 91 and is pin-connected as indicated at 97 to the respective crank arm 41. The arrangement is such that upon operation of a motor EM to rotate the respective output shaft 85 and the crank 87 thereon through a single revolution, the respective trap door 53 is swung down from its initial horizontal position to a downwardly extending vertical position, and returned back upward to horizontal position.

Means is provided for energizing each motor to drive the respective shaft 85 and crank 87 through a single revolution, and then deenergizing the motor. As to each motor, this means includes a motor switch mounted on gear box 83 above the hub 89 of the crank 87. Each motor switch is generally designated by the letters MS, and in FIGS. 8 and 16 the switches for motors EM1, EM2 and EM3 are specially designated MS1, MS2 and MS3. Each of hubs 89 is formed as a cam with a lobe 99 engageable with actuator 101 of the respective motor switch. The arrangement is such that the trailing end of lobe 99 is initially just off the switch actuator (see FIG. 9). Upon energization of the motor, shaft 85 (under control as will be subsequently described) and crank 87 rotate clockwise as viewed in FIG. 9. Near the end of a revolution, lobe 99 engages and actuates the switch actuator 101. This instigates deenergization of the motor as will be made clear, and the shaft 85 and crank 87 complete a single revolution, returning to their initial FIG. 9 position. Upon each revolution of crank 87, link 91 is driven downward and then pulled back upward, thereby to swing trap door 53 downward and then move it back upward.

Each of the columns C is suspended from the top of the cabinet by track means generally designated T which permits each column to slide forward and rearward. As to each column, track means T comprises a pair of outer rails, each designated 103, secured to the top of the cabinet. Each of these fixed outer rails 103 is of channel section. The two rails of the pair are arranged vertically with their open sides opposed to one another, extending from front to rear of the cabinet. Each rail has a Z-section bar 105 (see FIGS. 14, 15 and 17) fixed to the inside thereof extending horizontally from near its forward end to near its rearward end. Bars 105, in conjunction with the bottom flanges 107 of the pair of fixed rails 103, define a pair of channels in which slide a pair of extensible inner rails 109. The latter are of channel shape in cross section. Each carries upper and lower rollers 111 and 113 at both the front and rear, upper and lower rollers 115 and 117 at the center of its length, a lower roller 119 intermediate front and center, and a lower roller 121 intermediate center and rear. The lower rollers of each inner rail 109 project through openings such as indicated at 123 in the bottom flange 125 of the inner rail 109, and ride on bottom flange 107 of the respective fixed outer rail 103. The top flange 127 of each inner rail 109 terminates short of the upper rollers 111 at the ends of the inner rail. These upper rollers 111 project up above the top flange 127 of the inner rail, being engageable with the horizontal web of the Z-section bar 105.

The hroizontal flanges 15 of the column top channel 9 bear on the lower rollers of the inner rails 109 and are confined by the upper center rollers 115 of the inner rails. The pair of inner rails 109 is slidable forward and rearward in the fixed outer rails 103, and channel 9 is slidable forward and rearward relative to the inner rails. As herein illustrated, the track arrangement is adapted for forward slide-out of the inner rails 109 and channel 9 so that each column C is movable from retracted position within cabinet 1 to a forward loading position outside the cabinet (note FIG. 3 in which column C5 is shown in forward loading position). Means is provided for limiting forward movement of the inner rails 109, and means is provided for limiting forward movement of channel 9 relative to the inner rails.

The means for limiting the forward movement of each pair of extensible inner rails 109 comprises a pair of blocks 129, one on each rail 109 of the pair, secured to the rear ends of the rails 109. Each block has a lateral projection 131 (see FIG. 18) extends underneath the bottom edge of the downwardly extending vertical flange 133 of the respective Z-section bar 105. Flange 133 has a downwardly extending projection 135 at the center of its length. On forward slide-out of the extensible inner rails 109, projections 131 engage the rear edges of projections 135 to limit the forward movement of the inner rails, the arrangement being such that about half the length of the inner rails then projects forward out of cabinet 1. Blocks 129 are removable from the rear ends of rails 109 and attachable to the forward ends of rails 109 for reversing the slide-out when it is desired to have the columns slide out rearward to a rearward loading position. Projections 131 are then engageable with the forward edges of projections 135.

The means for limiting the forward movement of the channel 9 relative to the inner rails 109 comprises a pair of lugs 137 carried by channel 9, one at each side of channel 9 on the inside of the respective side wall 13 of the channel. These lugs are integral parts of blocks 139 secured to side walls 13 of channel 9, and project upward above the level of horizontal flanges 15 of the channel. The two inner rails 109 of the track means T for each column are interconnected at their forward ends by a bridge piece 141 of inverted U-shape (see FIG. 17). The sides of this bridge piece have inwardly directed feet 143 at their lower ends. On forward slide-out of channel 9 relative to the inner rails 109 lugs 137 on the channel engage the feet 143 on the bridge piece 141 to limit the forward movement of channel 9 relative to the inner rails. The arrangement is such that with the inner rails 109 extended to their limit, and channel 9 extended to its limit, the column is fully extended as illustrated for column C5 in FIG. 3. The bridge piece 141 is removable from the forward end of the pair of inner rails 109 and attachable to the rearward end thereof for reversing the slide-out when it is desired to have the columns slide out rearward to a rearward loading position. Each channel 9 has a pair of bumpers 144 at its forward end which bump the forward edges of the outer rails 103 when the column is moved inward from its loading position. These are removable and attachable to the rear end of channel 9 when it is desired to have the columns slide out rearward to a rearward loading position.

Figure 12:
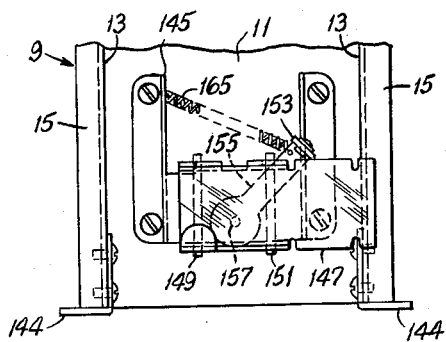
FIG. 12 is an enlarged fragment of FIG. 8, showing mechanism for actuating a magazine empty switch.
Figure 13:
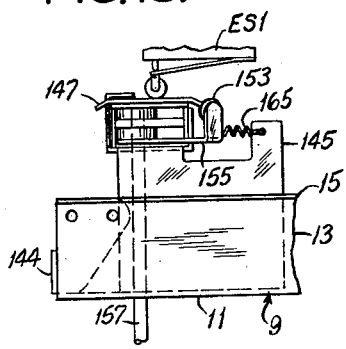
FIG. 13 is a side elevation of FIG. 12.
Figure 14:
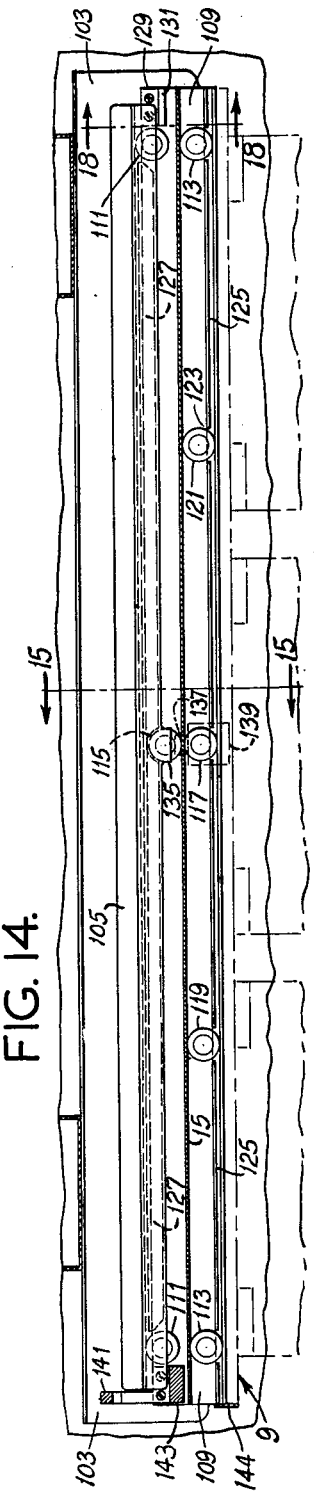
FIG. 14 is an enlarged vertical section taken on line 14—14 of FIG. 2.
Figure 15:
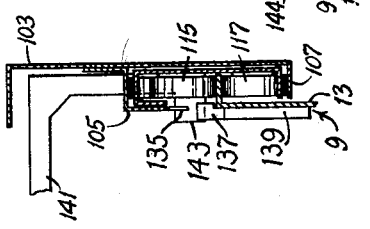
FIG. 15 is a vertical section taken on line 15—15 of FIG. 14.
Figure 16:
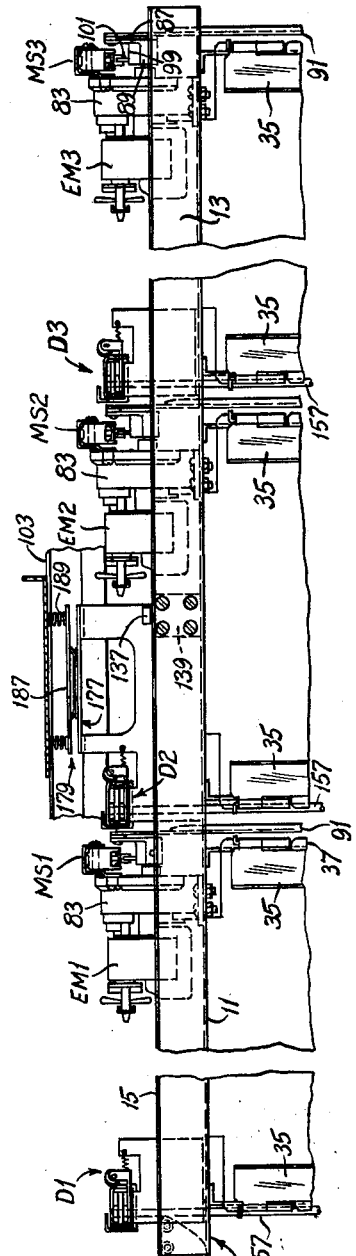
FIG. 16 is an enlarged elevation of the upper portion of a column, with parts broken away to reduce the length of the view, and showing a contact arrangement.

The machine includes a plurality of empty switches, one for each magazine. Each switch is generally designated by the letters ES, and the empty switches for magazines M1, M2 and M3 are specially designated ES1, ES2 and ES3. The empty switches are secured to the top of the cabinet between the outer rails 103. Thus, between each pair of outer rails 103 there are three empty switches, one at the front, the second at a position corresponding to the location of space 23 between the front and intermediate magazines of the respective column C when the latter is in retracted position in cabinet 1, and the third at a position corresponding to the location of the space 23 between the intermediate and rear magazines of the respective column C when the latter is in retracted position in cabinet 1. For each empty switch, there is an operating mechanism, generally designated by the letter D. In FIGS. 8 and 16, the empty switch operating mechanisms for magazines M1, M2 and M3 are specially designated D1, D2 and D3. Each empty switch operating mechanism comprises a support 145 of inverted U-shape mounted on the web 11 of channel 9. A switch-actuating lever 147 is pivoted at 149 on top of support 145 for swinging movement on a horizontal axis extending lengthwise as regards channel 9. Downward swing of lever 147 is limited by its engagement with a stop pin 151 carried by support 145. With channel 9 in retracted position within cabinet 1, lever 147 is adapted to be held up in a switch actuating position by a roller 153 on an arm 155 secured to the upper end of a feeler rod 157. Each rod is journalled in an opening in the top of the respective support 145, and extends downward therefrom through web 11 of channel 9. The rod 157 for the front magazine of each column extends down in front of the front magazine. The rod 157 for the intermediate magazine of each column extends down in the space 23 between the front and intermediate magazines. The rod 157 for the rear magazine of each column extends down in the space 23 between the intermediate and rear magazine. Each rod 157 is journalled adjacent its lower end in an ear 159 struck out from the front flange 19 of the respective magazine. At its lower end, each rod 157 has an offset finger 161 adapted to feel into the respective magazine through a slot 163 in the front flange 19 of the magazine. A coil tension spring 165 connected between support 145 and arm 155 biases the arm and the rod 157 to swing counterclockwise as viewed from above, which is in the direction to swing the feeler finger 161 into the magazine to detect whether or not there is a carton on the trap door 53. Feeler finger 161 is adapted to be held out of the magazine by engagement with a carton on the trap door 53 (see FIG. 19), and when the last carton is dispensed from the magazine, feeler finger 161 is released to swing into the magazine. Spring 165 thereupon rotates arm 155 clockwise as viewed in FIG. 20 from its FIG. 20 position (wherein it has held lever 147 up) to the position such as shown in FIGS. 8, 12 and 16 (the magazine empty position), thereby carrying roller 153 out from under lever 147 and releasing the latter to deactuate the empty switch.

At the bottom of each column C is a chute 167 for delivering a carton dispensed from any one of the three magazines in the column to a pan 169 in the door 7. The latter has an access opening 171 for access to a carton delivered to the pan. Each chute comprises a pair of side walls 173 and an inclined bottom 175 which slopes downward from the rear toward the front of the machine, corresponding to the stepped arrangement of the lower ends of the three magazines in the column. A carton sliding off the trap door 53 of any magazine in a column drops down onto the bottom 175 of the respective chute, and slides down the chute to the pan 169.

As will be apparent, the three motors EM and the three switches MS on top of each column C are carried out of the cabinet 1 when the column is moved to loading position, and back into the cabinet when the column is moved back in to its retracted position within the cabinet. Means is provided for connecting the three motors EM and the three switches MS on top of each column C into an electrical control system of the machine to be described when the column is in retracted position, and for disconnecting the three motors from the system when the column is pulled out of the cabinet. As shown, this means comprises a contact assembly 177 on top of column C and a contact assembly 179 carried by the top of the cabinet 1. Contact assembly 177 comprises an insulation board 181 carrying seven wipers such as indicated at 183. This board is mounted on top of a support 185 provided on channel 9. Contact assembly 179 comprises an insulation board 187 spring-mounted as indicated at 189 underneath the top of the cabinet 1, and carrying seven contacts engageable by wipers 183 on board 181 when the column is in its retracted position in the cabinet. On pulling out the column, wipers 183 disengage from the contacts on board 187. As will be readily understood, suitable wiring harness is provided in channel 9 connecting wipers 183 to the three motors EM and three switches MS on the channel. This wiring harness has been omitted from FIGS. 8 and 16.

Each door 7 of the cabinet 1 has a large window 191 (see FIG. 1) behind, which is a panel 193 on which samples of cartons stocked in the machine may be displayed. Below the window 191 is the access opening 171, which extends the full width of the six columns C1–C6. At the right side of the left-hand door is an array of push buttons each generically designated by the letter B. There are eighteen such push buttons in this array, one for each of the eighteen magazines M1–M18 of the left-hand unit of the machine, arranged in a vertical series of nine pairs, and specifically designated B1 to B18. Button B1 is related to magazine M1, button B2 is related to magazine M2, etc. There is a similar array of eighteen push buttons for the eighteen magazines of the right-hand unit of the machine. Above each button is a small window 193 through which may be displayed a printed card or the like denoting the brand of cigarettes in the respective magazine and the price thereof. Each of the buttons is adapted to be pushed in by a purchaser to actuate a switch generically designated by letter S, there being eighteen of these switches.

Figure 21:
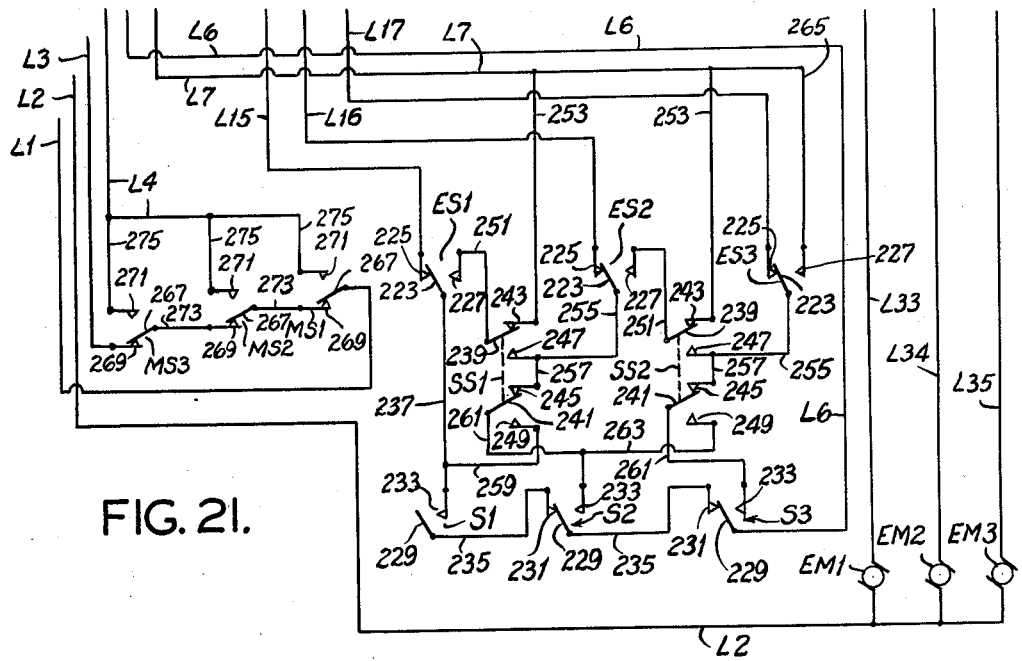
FIGS. 21 and 22 are wiring diagrams.
Figure 22:
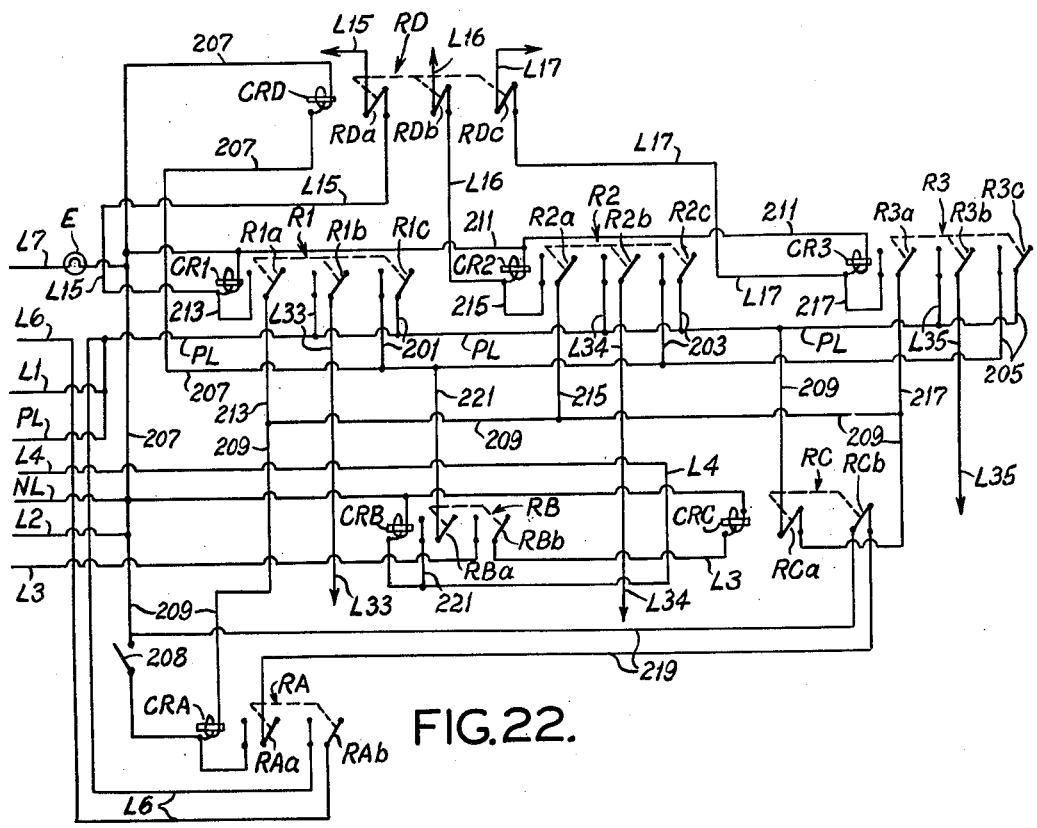

The electrical control system of the machine is illustrated in FIGS. 21 and 22. For condensation of the drawings and simplification of the description, FIGS. 21 and 22 show only those components of the system for controlling the operation of the motors for the first three magazines M1, M2, M3 of the left-hand unit of the machine. Certain of the components shown in FIG. 22 are also utilized in controlling the motors of magazines M4–M18 of the left-hand unit. The additional components required for controlling the motors for these magazines M4–M18 are simply additive to those shown in FIGS. 21 and 22, and identical to certain components shown in FIGS. 21 and 22, as will be made clear. It will be understood that the control system for the eighteen magazines of the right-hand unit of the machine is a duplicate of the control system for the eighteen magazines of the left-hand unit.

FIG. 22 shows the portion of the electrical control system in the money-handling unit 3. This comprises push-button-responsive relays R1–R3, controlled by the switches S1, S2 and S3 which are operated by push buttons B1, B2 and B3, respectively, and four additional relays RA, RB, RC and RD. Here it will be understood that, with eighteen magazines in the left-hand unit and the eighteen push buttons and switches therefor, money-handling unit 3 will actually include eighteen relays like R1, R2 and R3. Each of relays R1, R2 and R3 is a single-throw triple-pole relay. Thus, relay R1 comprises a coil CR1, and three normally open switches R1a, R1b and R1c. Relay R2 comprises a coil CR2, and three normally open switches R2a, R2b and R2c. Relay R3 comprises a coil CR3, and three normally open switches R3a, R3b and R3c. Relay RA is a single-throw double-pole relay comprising a coil CRA, and two normally open switches RAa and RAb. Relays RB and RC are single-throw double-pole relays. Relay RB has a coil CRB and two normally open switches RBa and RBb. Relay RC has a coil CRC and two normally closed switches RCa and RCb. Relay RD, as shown in FIG. 22, is a single-throw triple-pole relay having a coil CRD, and three normally open switches RDa, RDb and RDc. However, it will be understood that, with eighteen magazines in the left-hand unit, relay RD will actually have eighteen switches in all.

A main power line PL leads into unit 3, and a neutral line NL leads out of unit 3. Switch R1b is connected in a line L33 extending from power line PL. Switch R2b is connected in a line L34 extending from power line PL. Switch R3b is connected in a line L35 extending from power line PL. Here it will be understood that, in the complete electrical control system for the eighteen magazines of the left-hand unit, there are eighteen relays like R1, R2 and R3 and eighteen lines like L33, L34 and L35 extending from these relays. Switches R1c, R2c and R3c are connected in branch lines 201, 203 and 205 connected to a common line 207 which includes coil CRD of relay RD and which connects to neutral line NL. Normally closed switch RCa of relay RC is connected in series with coil CRA of relay RA and a money switch 208 in a line 209 connected between power line PL and neutral line NL. Switch 208 is normally open, being closed in response to insertion by a purchaser into money-handling unit 3 of a sufficient amount of money. When switch 208 closes, relay coil CRA is energized.

Switches RDa, RDb and RDc of relay RD are respectively connected in series with coils CR1, CR2 and CR3 of relays R1, R2 and R3 via lines L15, L16, L17 and a common return line 211 connected to line 207 and thus connected to neutral line NL. Switches R1a, R2a and R3a are connected in holding circuits 213, 215 and 217 for relay coils CR1, CR2 and CR3, respectively, branching off from line 209, and each being thereby in series with switch RCa of relay RC. A holding circuit 219 is provided for relay coil CRA. This holding circuit includes normally closed switch RCb and normally open switch RAa and is adapted to shunt money switch 208. Switch RBb of relay RB and coil CRC are connected in series with one another in a line L3 which is connected to neutral line NL. Coil CRB is connected in a line L4 which is connected to neutral line NL. A holding circuit 221 for coil CRB is connected between lines 207 and L4 and includes switch RBa. A line L1 is connected directly to power line PL. A line L2 is connected to line 207, hence to neutral line NL. A line L6 including switch RAb is connected to power line PL. A line L7 including an "empty" signal lamp E is connected to line 207.

Now referring to FIG. 21, lines L33, L34 and L35 are shown to be respectively connected to one terminal of each of motors EM1, EM2 and EM3, respectively. Line L2 is a common line for the other terminals of the motors. Here it will be understood that, with eighteen motors in the left-hand unit of the machine, there are actually eighteen lines like L33, L34 and L35 in the machine, each connected to a respective motor, and that all eighteen motors are connected to line L2. The empty switches ES1, ES2 and ES3 for magazines M1, M2 and M3 are shown in FIG. 21, and it will be understood that eighteen such empty switches would actually appear in FIG. 21 if the latter were expanded to show the control system for all eighteen magazines of the left-hand unit. Each empty switch is a double-throw switch having a blade 223 normally closed on a first contact 225 and movable to close on a second contact 227 when the last carton in the respective magazine is dispensed. Lines L15, L16 and L17 are connected to contacts 225 of empty switches ES1, ES2 and ES3.

FIG. 21 also shows the purchaser-operable switches S1, S2 and S3 (which are operated by the push buttons B1, B2 and B3). It will be understood that eighteen such switches would appear in FIG. 21 if the latter were expanded to show the control system for all eighteen magazines of the left-hand unit of the machine. Switch S1 is a single-throw normally open switch. Each of switches S2 and S3 is a double-throw switch, having a blade 229 normally closed on a first contact 231 and movable to close on a second contact 233. The purchaser-operable switches for magazines M4–M18 would be double-throw switches like S2 and S3. Line L6 is connected to the blade of the last switch. The blade of switch S1 is connected to the first contact of switch S2 by a line 235, the blade of switch S2 is connected to the first contact of switch S3 by a similar line 235 and, in the complete system for all eighteen magazines of the left-hand unit, this relationship continues all the way to the last switch (which would be switch S18). The blade of the first empty switch ES1 is connected by a line 237 to the first purchaser-operable switch S1 for completion of an L6–L15 circuit when switch S1 is in its normal position wherein its blade 223 is on its first contact 225. This L6–L15 circuit is completed via the remaining purchaser-operable switches S2 and S3.

FIG. 21 shows two manually operable double-throw double-pole switches SS1 and SS2. These are magazine transfer switches. Seventeen such switches would appear if FIG. 21 were expanded to show the control system for all eighteen magazines of the left-hand unit of the machine. Each such transfer switch is adapted to be set either in a first position for control of each magazine solely by the related push button, or in a second position for automatically transferring vending operations from one magazine to another when the former is emptied. Thus, for example, switch SS1, when set in its second position, automatically transfers vending operations from magazine M1 to magazine M2 when magazine M1 is emptied, and allows either button B1 or B2 to be pushed in for vending from M1 or M2. Switch SS2, when set in its second position, automatically transfers vending operations from magazine M2 to magazine M3 when magazine M2 is emptied, and allows either button B2 or B3 to be pushed in for vending from M2 or M3. With both switches SS1 and SS2 set in second position, vending occurs from magazine M1 until it is empty on pushing any of buttons B1, B2 or B3, then from M2 until it is empty no matter which of these buttons is pushed, and then from M3 no matter which of these buttons is pushed. The arrangement is such that it is possible to set up the machine for vending different brands from each of the eighteen magazines (in which case all the transfer switches are left in first position) or for vending the same brand from any desired number of magazines. For example, the first three magazines M1–M3 may be stocked with the same brand, and switches SS1 and SS2 set for automatic transfer from M1 to M2 when M1 is empty and from M2 to M3 when M2 is empty. Push buttons B1–B3 would then be designated (by means of the cards in the small windows) as controlling the vending of the same brand, and pushing in any one of these buttons results in dispensing from M1 until it is empty, from M2 until it is empty, and then from M3. The transfer switches may be toggle switches, for example, and mounted in any convenient location in the machine.

Each transfer switch comprises a pair of blades 239 and 241 movable from a first position closed on contacts 243 and 245 to a second position closed on contacts 247 and 249. The blade 239 of each transfer switch is connected by a line 251 to the contact 227 of the respective empty switch. Thus, blade 239 of switch SS1 is connected to contact 227 of empty switch ES1, etc. Contact 243 of each transfer switch is connected by a line 253 to line L7. Contact 247 of each transfer switch is connected by a line 255 to the blade 223 of the next successive empty switch. Thus, contact 247 of switch SS1 is connected to blade 223 of empty switch ES2, etc. Contacts 245 and 247 of each transfer switch are interconnected as indicated at 257. A line 259 connects line 237 and contact 249 of switch SS1. Each transfer switch has its blade 241 connected by a line 261 to contact 233 of the next successive purchaser-operable switch and by a line 263 to the contact 249 of the next successive transfer switch. Thus, blade 241 of transfer switch SS1 is connected to contact 233 of switch S2 and to contact 249 of transfer switch SS2. Contact 227 of empty switch ES3 is shown as connected by a line 265 to line L7. Actually, in the complete circuit for all eighteen magazines, it would be connected by a line corresponding to lines 251 to the blade 239 of the next transfer switch (which would be SS3). Also, while FIG. 21 shows line L6 connected to the blade of switch S3, it will be understood that in the complete layout, L6 would be connected to the blade of a switch S18 and switches S4–S18 would be added between S3 and line L6.

FIG. 21 shows the cam-operated switches MS1, MS2 and MS3 for the first three magazines M1, M2 and M3, and it will be understood that eighteen such switches would appear in a full layout. Each of these switches is a double-throw switch, having a blade 267 adapted to close on either of first and second contacts 269 and 271. Line L1 is connected to the blade of the first switch MS1 and line L3 is connected to contact 269 of the last switch. The contact 269 of each switch except the last is connected to the blade 267 of the next switch as indicated at 273, so that an L1—L3 circuit is established when all the switches are closed on contacts 269. Contacts 271 are connected as indicated at 275 to line L4.

Operation is as follows:

It will first be assumed that transfer switches SS1 and SS2 are set in their first position in which they appear in FIG. 21. Money switch 208 is closed by the purchaser's insertion of an appropriate amount of money in money-handling unit 227. Upon closure of money switch 208, a circuit for relay coil CRA is completed from power line PL via line 209 including normally closed switch RCa of relay RC to neutral line NL. Relay switches RAa and RAb thereupon close. Upon closure of switch RAa, holding circuit 219 for relay RA is completed (switch RCb being closed) to shunt switch 208. Upon closure of switch RAb, line L6 is connected to the power line PL.

Now assuming that the purchaser pushes button B1 to obtain a carton from magazine M1 (and assuming that there is at least one carbon in the latter), switch S1 is closed and a circuit is thereby completed through the series of purchaser-operated switches S1, S2, etc., between lines L6 and L15 (see FIG. 21). Momentary closure of switch S1 is sufficient. Line L6 being energized and connected to line L15, a circuit is completed for relay coil CR1 (see FIG. 22) via line L15 (switch RDa being closed), and lines 211 and 207 to neutral line NL. Switches R1a, R1b and R1c thereupon close. Upon closure of switch R1a, holding circuit 213 for relay R1 is completed. Upon closure of switches R1b and R1c, lines L33 and 207 are energized. With line 207 energized, relay coil CRD is energized, and switches RDa, RDb and RDc open. With these switches open, repeated operation of buttton B1 or operation of other buttons is ineffective to cause any circuit changes.

With line L33 energized, motor EM1 for magazine M1 is energized to drive crank 87 and cam lobe 99 for magazine M1. Crank 87 drives link 91 connected thereto downward, then pulls it back upward. As link 91 moves downward, it swings the crank arms 41 of magazine M1 downward (both these arms being fixed on the end of shaft 39 of magazine M1. Arms 41 carry rod 59 downward, thereby positively swinging the trap door 53 of magazine M1 downward from its horizontal raised position of FIG. 10 to its downwardly extending position of FIG. 11. As arms 41 swing downward, rod 47 slides under the bias of springs 49 from its retracted position of FIG. 10 to its stack-supporting position of FIG. 11 to hold up all the cartons above the lowermost carton. As rod 47 slides to stack-supporting position, presser plate 63 swings into the magazine under the bias of springs 73 to clamp the second carton and prevent it from tipping on rod 47. Accordingly, all the cartons above the lowermost carton are held up as the trap door 53 swings downward, and the lowermost carton slides off the trap door and into the column C1 chute 167 for delivery to the purchaser.

When link 91 is pulled back upward by crank 87, crank arms 41 are swung back upward and rod 59 returns the trap door 53 to its raised position. Arms 41 also push rod 47 back to its retracted position against the bias of springs 49, and rod 47, in returning to retracted position, pushes presser plate 63 back to retracted position against the bias of spring 73. The stack in magazine M1 then drops down onto the trap door 53.

As cam lobe 99, rotating with crank 87, approaches the end of a revolution, it actuates the control switch MS1 for motor EM1, i.e., it opens blade 267 of this switch from contact 269 and closes this blade on contact 271 (see FIG. 21). This connects line L1 (energized directly from power line PL) to line L4. Coil CRB of relay RB is thereupon energized via line L4, and switches RBa and RBb of this relay close. Closure of switch RBa establishes holding circuit 221 for coil CRB. Cam lobe 99 rides off the actuator 101 of switch MS1 as the lobe and crank 87 complete a revolution, so that switch MS1 returns to its initial position with its blade 267 on contact 269. Accordingly, line L3 is energized from line L1. With line L3 energized and switch RBb of relay RB closed, coil CRC of relay RC is energized. This opens switches RCa and RCb. This deenergizes holding circuit 219 for relay CRA, and the latter opens. It also deenergizes holding circuit 213 for relay R1 and the latter opens. With R1 open, switches R1b and R1c are open to deenergize lines L33 and 307, with the result that motor EM1 and relay coils CRD and CRB are deenergized. Relay RD thus recloses and relay RB reopens. When relay RB opens, relay RC is deenergized and its switches reclose. Thus, the initial circuit conditions are restored to be in readiness for the next vend cycle.

When the last carton in magazine M1 is dispensed, empty switch ES1 is deactuated as previously described, i.e., its blade 223 (see FIG. 21) opens off contact 225 and closes on contact 227. Then, when a purchaser pushes in button B1, a circuit is completed for the empty signal lamp E via line L6, the series of button-actuated switches S1, S2, etc., line 227, blade 223, line 251 extending from switch ES1, blade 229 of transfer switch SS1, line 253, line L7 and line 207 to neutral line NL. The empty signal lamp E in line L7 is thereby energized to indicate that magazine M1 is empty and to advise the purchaser to make another selection.

Assuming that a purchaser (after insertion of money to close switch 208) pushes button B2 to obtain a carton from magazine M2 (and assuming that there are cartons in the latter), switch S2 is closed and a circuit is thereby completed between lines L6 and L16 via S3, S2, line 261, blade 241 and contact 245 of transfer switch SS1, lines 257 and 255 and blade 223 and contact 225 of empty switch ES2. Line 6 being energized and connected to line L16, a circuit is completed for relay coil CR2 (see FIG. 22) via line L16 (switch RDb being closed), and lines 211 and 207 to neutral line NL. Switches R2a, R2b and R2c thereupon close. Upon closure of switch R2a, holding circuit 215 for relay R2 is completed. Upon closure of switches R2b and R2c, lines L34 and 207 are energized. With line 207 energized, relay coil CRD is energized, and switches RDa, RDb and RDc open to render the push buttons ineffective. With line L34 energized, motor EM2 for magazine M2 is energized to drive crank 87 and cam lobe 99 for magazine M2, and this results in dispensing of a carton from magazine M2 in the same manner as above described for magazine M1.

As the cam lobe 99 associated with magazine M2, rotating with the respective crank 87, approaches the end of a revolution, it actuates the control switch MS2 for motor EM2, i.e., it opens blade 267 of this switch from contact 269 and closes this blade on contact 271 (see FIG. 21). This connects line L1 (energized directly from power line PL) to line L4. Coil CRB of relay RB is thereupon energized via line L4, and switches RBa and RBb of this relay close. Closure of switch RBa establishes holding circuit 221 for coil CRB. Cam lobe 99 rides off the actuator 101 of switch MS2 as the lobe and crank 87 complete a revolution so that switch MS2 returns to its initial position with its blade 267 on contact 269. Accordingly, line L3 is energized from contact 269. With line L3 energized and switch RBb of relay RB closed, coil CRC of relay RC is energized. This opens switches RCa and RCb. This deenergizes holding circuit 219 for relay CRA, and the latter opens. It also deenergizes holding circuit 215 for relay R2 and the latter opens. With R2 open, switches R2b and R2c are open to deenergize lines L34 and 207, with the result that motor EM2 and relay coils CRD and CRB are deenergized. Relay RD thus recloses and relay RB reopens. When relay RB opens, relay RC is deenergized and its switches reclose. Thus, the initial circuit conditions are restored to be in readiness for the next vend cycle.

When the last carton in magazine M2 is dispensed, empty switch ES2 is deactuated as previously described, i.e., its blade 223 (see FIG. 21) opens off its contact 225 and closes on its contact 227. Then, when a purchaser pushes in button B2, a circuit is completed for the empty signal lamp E via line L6, switches S3 and S2, line 261 extending from S2, blade 241 and contact 245 of transfer switch LL1, lines 257 and 255 extending to empty switch ES2, blade 223 and contact 227 of the latter, line 251 extending from switch ES2, blade 239 and contact 243 of transfer switch SS2, line 253 extending from the latter, line L7 and line 207 to neutral line NL. The empty signal lamp E in line L7 is thereby energized to indicate that magazine M2 is empty and to advise the purchaser to make another selection.

Assuming that a purchaser (after insertion of money to close switch 208) pushes button B3 to obtain an item from magazine M3 (and assuming that there are cartons in the latter), switch S3 is closed and a circuit is thereby completed between lines L6 and L17 via S3, line 261 extending from S3, blade 241 and contact 245 of transfer switch SS3, lines 257 and 255 extending from SS3 and blade 223 and contact 225 of empty switch ES3. Line 6 being energized and connected to line L17, a circuit is completed for relay coil CR3 (see FIG. 22) via line L17 (switch RDc being closed), and lines 211 and 207 to neutral line NL. Switches R3a, R3b and R3c thereupon close. Upon closure of switch R3a, holding circuit 217 for relay R3 is completed. Upon closure of switches R3b and R3c, lines L35 and 207 are energized. With line 207 energized, relay coil CRD is energized, and switches RDa, RDb and RDc open to render the push buttons ineffective. With line L35 energized, motor EM3 for magazine M3 is energized to drive crank 87 and cam lobe 99 for magazine M3, and this results in dispensing of a carton from magazine M3 in the same manner as above described for magazine M1.

As the cam lobe 99 associated with magazine M3, rotating with the respective crank 87, approaches the end of a revolution, it actuates the control switch MS3 for motor EM3, i.e., it opens blade 267 of this switch from contact 269 and closes this blade on contact 271 (see FIG. 21). This connects lines L1 (energized directly from power line PL) to line L4. Coil CRB of relay RB is thereupon energized via line L4, and switches RBa and RBb of this relay close. Closure of switch RBa establishes holding circuit 221 for coil CRB. Cam lobe 99 rides off the actuator 101 of switch MS3 as the lobe and crank 87 complete a revolution so that switch MS3 returns to its initial position with its blade 267 on contact 269. Accordingly, line L3 is energized from line L1. With line L3 energized and switch RBb of relay RB closed, coil CRC of relay RC is energized. This opens switches RCa and RCb. This deenergizes holding circuit 219 for relay CRA, and the latter opens. It also deenergizes holding circuit 217 for relay R3 and the latter opens. With R3 open, switches R3b and R3c are open to deenergize lines L35 and 207, with the result that motor EM3 and relay coils CRD and CRB are deenergized. Relay RD thus recloses and relay RB reopens. When relay RB opens, relay RC is deenergized and its switches reclose. Thus, the initial circuit conditions are restored to be in readiness for the next vend cycle.

When the last carton in magazine M3 is dispensed, empty switch ES3 is deactuated as previously described, i.e., its blade 223 opens off its contact 225 and closes on its contact 227. Then, when a purchaser pushes in button B3, a circuit is completed for the empty signal lamp E via line L6, switch S3, line 261 extending from S3, blade 241 and contact 245 of transfer switch SS2, lines 257 and 255 extending from the latter, line 265, line L7 and line 207 to neutral line NL. The empty signal lamp E in line L7 is thereby energized to indicate that magazine M3 is empty and to advise the purchaser to make another selection.

Now it will be assumed that both transfer switches SS1 and SS2 are set in their second position, in which their blades 239 and 241 are on contacts 247 and 249. Under these circumstances, closure of any one of switches S1, S2 or S3 results in energization of line L15 for energization of line L33 to energize motor EM1 for magazine M1 for vending therefrom until it is emptied. Thus, when switch S1 is closed, line L15 is energized in the same manner as previously described. When S2 is closed, line L15 is energized from line L6 via switch S3, line 235 connecting S3 and S2, blade 229 and contact 233 of S2, line 261, blade 241 and contact 249 of transfer switch SS1, lines 259 and 237, and blade 223 and contact 225 of empty switch ES1. When S3 is closed, line L15 is energized from line L6 via S3, line 261 extending from S3, blade 241 and contact 249 of transfer switch SS2, line 263, blade 241 and contact 249 of transfer switch SS1, lines 259 and 237 and blade 223 and contact 225 of empty switch ES1.

When magazine M1 is emptied, the blade 223 of empty switch ES1 opens from its contact 225 and closes on its contact 227. Thereupon, closure of any one of switches S1, S2 or S3 results in energization of line L16 for energization of line L34 to energize motor EM2 for magazine M2 for vending therefrom until it is empty. Thus, when switch S1 is closed, line L16 is energized from line L6 via switches S3, S2, S1, line 237, blade 223 and contact 227 of switch ES1, line 251 extending from ES1, blade 239 and contact 247 of transfer switch SS1, line 255 extending from the latter, and blade 223 and contact 225 of switch ES2. When S2 is closed, lines L16 is energized from line L6 via switches S3 and S2, line 261, blade 241 and contact 249 of transfer switch SS1, line 259, line 237, blade 223 and contact 227 of ES1, line 251 extending from ES1, blade 239 and contact 247 of transfer switch SS1, line 255 extending from the latter, and blade 223 and contact 225 of ES2. When S3 is closed, line L16 is energized from line L6 via switch S3, line 261 extending from S3, blade 241 and contact 249 of transfer switch SS2, line 263, line 261 connected to blade 241 of SS1, and thence to line L16 in the same manner as when S2 is closed.

When magazine M2 is emptied, blade 223 of empty switch ES2 opens from its contact 225 and closes on its contact 227. Thereupon, closure of any one of switches S1, S2 or S3 results in energization of line L17 for energization of line L35 to energize motor EM3 for magazine M3 for vending therefrom. Thus, when switch S1 is closed, line L17 is energized from line L6 via switches S3, S2, S1, line 237, blade 223 and contact 227 of empty switch ES1, line 251 extending from ES1, blade 239 and contact 247 of SS1, line 255 extending from SS1, blade 223 and contact 227 of ES2, line 251 extending from ES2, blade 239 and contact 247 of SS2, line 255 extending from SS2, and blade 223 and contact 225 of ES3. When S2 is closed, line 17 is energized from line L6 via S3 and S2, line 261 extending from S2, blade 241 and contact 249 of SS1, line 237 and thence to line L17 in the same manner as when S1 is closed. When S3 is closed, line L17 is energized from L6 via line 261 extending from S3, blade 241 and contact 249 of SS2, line 263, line 261 extending to SS1, and thence to line L17 in the same manner as when S1 is closed.

From the above, it will be apparent that, with the transfer switches SS1 and SS2 for each two successive magazines or dispensers M1—M2 and M2—M3 set in their first position as illustrated in FIG. 21, a circuit is completed for each magazine or dispenser through the respective empty switch ES1, ES2 or ES3 only on operation of the respective purchaser-operable switch S1, S2 or S3 until the magazine or dispenser is empty. Thus, a circuit is completed for magazine or dispenser M1 through empty switch ES1 only on operation of purchaser-operable switch S1 until M1 is empty. A circuit is completed for M2 through empty switch ES2 only on operation of purchaser-operable switch S2 until M2 is empty. A circuit is completed for M3 through empty switch ES3 only on operation of purchaser-operable switch S3 until M3 is empty. The mode of operation for the remainder of the magazines in the complete layout of eighteen magazines is the same. When any magazine is empty, and the respective purchaser-operable switch therefor is actuated, the empty signal lamp E is energized.

When the transfer switches SS1 and SS2 are set in their second position, a circuit is completed for the first magazine or dispenser M1 through its empty switch ES1 each time any purchaser-operable switch S1, S2 or S3 is actuated until the first empty switch ES1 is actuated in response to emptying of M1. When M1 is empty, a circuit for the second magazine or dispenser M2 is completed through the first empty switch ES1, the first transfer switch SS1 and the second empty switch ES2 each time any purchaser-operable switch S1, S2 or S3 is actuated until the second empty switch ES2 is actuated in response to emptying of M2. When M2 is empty, a circuit for the third magazine or dispenser M3 is completed through the first empty switch ES1, the first transfer switch SS1, the second empty switch ES2, the second transfer switch SS2 and the third empty switch ES3 each time any purchaser-operable switch S1, S2 or S3 is actuated until the third empty switch ES3 is actuated in response to emptying of M3.

If all seventeen transfer switches in the complete layout were initially set in their second position, vending would proceed in sequence throughout the entire eighteen magazines or dispensers M1—M18 as each becomes empty in response to actuation of any one of the eighteen purchaser-operable switches. Usually, however, only a series of magazines less than the full eighteen would be so utilized.

For loading the machine, each column is pulled to its loading position such as illustrated for the column C5 in FIG. 3. Flaps 35 of each magazine of the column are then slid upward and swung outward for insertion of cartons in the magazine from the right side of the column, where the magazines are accessible for such side loading. When a column is pulled out, the contact assembly 177 on top of the column disengages from the fixed contact assembly 179 at the top of the cabinet. When the column is pushed back in after loading, assembly 177 re-engages assembly 179.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Dispensing apparatus comprising a magazine of rectangular shape in cross section adapted to receive a stack of items to be vended, a rock shaft extending between two opposite sides of the magazine at a third side of the magazine and adjacent the bottom of the magazine, crank arms on the ends of the shaft outside said two opposite sides of the magazine, a trap door swingable with the crank arms on the axis of the shaft adapted to occupy a raised position for holding up the stack and being swingable downward from raised position for dispensing the lowermost item, the shaft extending adjacent one edge of the door and being offset below the upper surface of the door so that the door may swing down freely without pushing up on the stack, a rod slidable in horizontal slots in said two opposite sides of the magazine at a level corresponding to the level of the bottom of the second item next above the lowermost item, each crank arm having a connection with a respective end of the rod, and means connected to one of the crank arms for rocking it away from and back to a retracted position to effect downward swing of the trap door and movement of the rod from a retracted position clear of the stack to a stack-supporting position under the second item and then to effect retraction of the rod and raising of the door.

2. Dispensing apparatus as set forth in claim 1, the arms having a connection with the rod by having notches receiving the ends of the rod, spring means biasing the rod toward stack-supporting position, the notches being formed so that the arms disengage from the rod before downward swing of the door is completed, the spring means then completing the movement of the rod to stack-supporting position.

3. Dispensing apparatus as set forth in claim 2, a presser plate pivoted at said third side of the magazine for movement from a retracted position clear of the stack through an opening in said third side to press sidewise against the second item, and spring means biasing the plate toward the second item, said plate being engageable with the rod and being held in retracted position by the rod when the latter is in retracted position, and being released for movement toward the second item when the rod moves toward stack-supporting position.

4. A vending machine comprising a cabinet, a plurality of vending columns, each column comprising an elongate top member and a plurality of magazines secured at their upper ends to the top member and extending down therefrom, said magazines being of rectangular cross section and spaced along the length of the top member, means at the top of the cabinet mounting the column top members for sliding movement in front-to-rear direction whereby each column may be moved in front-to-rear direction from a position within the cabinet to a loading position outside the cabinet, each magazine being adapted to hold a stack of items and to be loaded with items from one side thereof when the column including the magazine is in loading position, each magazine having a trap door pivoted at the bottom thereof on a horizontal axis extending between the front and back of the magazine, said door being adapted to occupy a raised position for holding up the stack in the magazine and being swingable downward from raised position for dispensing the lowermost item, each magazine also having means for holding up all items above the lowermost item while the respective trap door swings down and until it is raised back to closed position whereupon the stack is released to drop down onto the door, and each magazine having means for actuating the respective trap door and holding means including an electric motor mounted on the respective top member and a connection to said trap door and holding means at the rear of the magazine.

5. A vending machine as set forth in claim 4 wherein each column has a contact assembly on the top member thereof with connections from said contact assembly to the motors on said top member, and wherein contact assemblies, one for each column, are fixed at the top of the cabinet, the contact assembly on the top member of each column contacting the respective fixed contact assembly when the column is in the cabinet and disengaging therefrom when the column is moved to loading position.

6. A vending machine comprising a cabinet, a plurality of vending columns, each comprising a plurality of magazines one behind another, each magazine being adapted to hold a stack of items to be vended, means mounting the columns for individual sliding movement thereof in front-to-rear direction from a position within the cabinet to a loading position outside the cabinet, the columns being positioned side-by-side closely adjacent one another when in the cabinet, any magazine being adapted to be loaded with items from one side thereof when the column including that magazine is in loading position, actuating means associated with each magazine for effecting the dispensing of items therefrom, the actuating means for each magazine including an electric motor mounted on top of the respective column, a contact assembly on top of each column with connections from said contact assembly to the motors on top of the column, and fixed contact assemblies, one for each column, at the top of the cabinet, the contact assembly on top of each column contacting the respective fixed contact assembly when the column is in the cabinet and disengaging therefrom when the column is moved to loading position.

7. A vending machine comprising a cabinet having a front door and a removable back panel, a plurality of vending columns, each comprising a plurality of magazines one behind another, each magazine being adapted to hold a stack of items to be vended, means mounting the columns for individual sliding movement thereof from a position within the cabinet either through the front of the cabinet when the door is open to a loading position in front of the cabinet or through the rear of the cabinet when the panel is open to a loading position in the rear of the cabinet, the columns being positioned side-by-side closely adjacent one another when in the cabinet, any magazine being adapted to be loaded with items from one side thereof when the column including that magazine is in either loading position, and actuating means associated with each magazine for effecting dispensing of items therefrom.

8. A vending machine as set forth in claim 7 wherein the mounting means for each column comprises a pair of fixed rails at the top of the cabinet and a pair of extensible rails slidable relative to the fixed rails, the column being suspended from the extensible rails and slidable relative thereto, each of the extensible rails having a stop interchangeable as to position to limit either the forward or rearward sliding movement of the extensible rails relative to the fixed rails, and each column having a stop for limiting either its forward or rearward sliding movement relative to the respective extensible rails.

9. In a vending machine, a magazine adapted to receive a stack of items to be vended, a pivoted trap door at the bottom of the magazine adapted to occupy a raised position for holding up the stack and swingable downward from raised position for dispensing the lowermost item, and means for holding up all items above the lowermost item while the door swings down and until it is raised back to closed position whereupon the stack is released to drop down onto the door, said means comprising an auxiliary stack support movable from a retracted position clear of the stack to a stack-supporting position under the second item next above the lowermost item, and a presser movable from a retracted position clear of the stack into engagement with one side of the second item, said auxiliary stack support comprising a rod mounted for horizontal sliding movement in a direction transverse to its length from a retracted position at one side of the stack to a stack-supporting position generally centered under the second item, said presser comprising a pivoted plate spring-biased toward the second item and normally held back by said rod against the spring bias in retracted position clear of the stack and adapted on engagement with one side of the second item to prevent tilting of the second item on said rod.

10. In a vending machine, a magazine of rectangular shape in cross section adapted to receive a stack of items to be vended, a trap door pivoted at the bottom of the magazine on a horizontal axis extending between two opposite sides of the magazine, said door being adapted to occupy a raised position for holding up the stack and being swingable downward from raised position for dispensing the lowermost item, the pivot axis of the door extending adacent one edge of the door and being offset below the upper surface of the door so that the door may swing down freely without pushing up on the stack, and means for holding up all items above the lowermost item while the door swings down and until it is raised back to closed position whereupon the stack is released to drop down onto the door, said means including a rod slidable in horizontal slots in said two opposite sides of the magazine at a level corresponding to the level of the bottom of the second item next above the lowermost item, said rod normally occupying a retracted position clear of the stack and being slidable in said slots to a stack-supporting position under said second item as the door swings down, and a presser plate pivoted on the magazine for swinging movement from a retracted position clear of the magazine into engagement with one side of the second item, spring means biasing the plate toward the second item, the plate being controlled by the rod and normally being held back in retracted position by the rod when the latter is in its retracted position.

11. A vending machine comprising a cabinet, a plurality of vending columns, each comprising a plurality of magazines one behind another, each magazine being of rectangular shape in cross section and adapted to receive a stack of items to be vended one resting on top of another and having means for dispensing the lowermost item of the stack while holding up the remainder of the items in the stack, means mounting the columns for individual sliding movement thereof in front-to-rear direction from a position within the cabinet to a loading position outside the cabinet, the columns being positioned side-by-side closely adjacent one another when in the cabinet, any magazine being adapted to be loaded with items from one side thereof when the column including that magazine is in loading position, the dispensing means for each magazine comprising a trap door pivoted at the bottom of the magazine on a horizontal axis extending between the front and back of the magazine, said door being adapted to occupy a raised position for holding up the stack and being swingable downward from raised position for dispensing the lowermost item, the pivot axis of the door extending adjacent one edge of the door and being offset below the upper surface of the door so that the door may swing down freely without pushing up on the stack, and means for holding up all items above the lowermost item while the door swings down and until it is raised back to closed position whereupon the stack is released to drop down onto the door, said means for holding up all items above the lowermost item comprising a rod slidable in horizontal slots in the front and back of the magazine at a level corresponding to the level of the bottom of the second item next above the lowermost item, said rod normally occupying a retracted position clear of the stack and being slidable in said slots to a stack-supporting position under said second item as the door swings down, and a presser plate pivoted on the magazine for swinging movement from a retracted position clear of the magazine into engagement with one side of the second item, spring means biasing the plate toward the second item, the plate being controlled by the rod and normally being held back in retracted position by the rod when the latter is in its retracted position.

References Cited in the file of this patent

UNITED STATES PATENTS

| | | |
|---|---|---|
| 1,400,814 | Grover | Dec. 20, 1921 |
| 1,778,187 | Du Grenier | Oct. 14, 1930 |
| 1,969,170 | Erickson | Aug. 7, 1934 |
| 2,433,472 | McLaughlin | Dec. 30, 1947 |
| 2,435,793 | Mielke | Feb. 20, 1948 |
| 2,805,106 | Penkala | Sept. 3, 1957 |
| 2,825,488 | Nelson | Mar. 4, 1958 |
| 2,919,051 | Wideburg et al. | Dec. 29, 1959 |
| 2,925,307 | Stoner | Feb. 16, 1960 |
| 2,954,900 | Brubaker | Oct. 4, 1960 |
| 2,971,675 | Allegri | Feb. 14, 1961 |